United States Patent
Boger et al.

(10) Patent No.: US 6,996,556 B2
(45) Date of Patent: Feb. 7, 2006

(54) METADATA MANAGER FOR DATABASE QUERY OPTIMIZER

(75) Inventors: Curtis Neal Boger, Oronoco, MN (US); John Francis Edwards, Rochester, MN (US); Randy Lynn Egan, Rochester, MN (US); Michael S. Faunce, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 481 days.

(21) Appl. No.: 10/224,135

(22) Filed: Aug. 20, 2002

(65) Prior Publication Data
US 2004/0039729 A1 Feb. 26, 2004

(51) Int. Cl.
*G06F 17/30* (2006.01)

(52) U.S. Cl. ........................................................ 707/3

(58) Field of Classification Search .............. 707/1–10, 707/100–104.1; 711/141
See application file for complete search history.

(56) References Cited

U.S. PATENT DOCUMENTS

| | | | |
|---|---|---|---|
| 6,477,540 B1 * | 11/2002 | Singh et al. ............ | 707/103 R |
| 6,591,272 B1 * | 7/2003 | Williams ................. | 707/102 |
| 6,594,651 B2 * | 7/2003 | Kabra et al. ............ | 707/2 |
| 6,732,084 B1 * | 5/2004 | Kabra et al. ............ | 707/2 |
| 2003/0208490 A1 * | 11/2003 | Larrea et al. ........... | 707/9 |
| 2004/0006575 A1 * | 1/2004 | Visharam et al. ....... | 707/104.1 |
| 2004/0123048 A1 * | 6/2004 | Mullins et al. .......... | 711/141 |

OTHER PUBLICATIONS

Herve Lejeune, Scalability and Performance Oracle 9i Databases, Mar. 2002, Oracle White Paper, pp. 1-24.*

* cited by examiner

*Primary Examiner*—Diane Mizrahi
(74) *Attorney, Agent, or Firm*—Wood, Herron & Evans, LLP (57) ABSTRACT

A metadata manager is used in a database management system to collect and maintain metadata associated with a database. Multiple optimizer instances are permitted to access the metadata maintained by the metadata manager, often eliminating the need for individual optimizer instances to retrieve and process metadata directly from the database. As such, the overhead associated with operations such as collecting, refining, retrieving and/or maintaining of metadata can be off-loaded from the optimizer instances, often accelerating individual cost estimation calculations by optimizer instances, facilitating reuse of metadata calculations and refinements, and improving metadata consistency between multiple related cost estimates.

34 Claims, 6 Drawing Sheets

METADATA MANAGER FOR DATABASE QUERY OPTIMIZER

FIELD OF THE INVENTION

The invention relates to database management systems, and in particular, to database query optimizers utilized in such systems.

BACKGROUND OF THE INVENTION

Databases are used to store information for an innumerable number of applications, including various commercial, industrial, technical, scientific and educational applications. As the reliance on information increases, both the volume of information stored in most databases, as well as the number of users wishing to access that information, likewise increases. Moreover, as the volume of information in a database, and the number of users wishing to access the database, increases, the amount of computing resources required to manage such a database increases as well.

Database management systems (DBMS's), which are the computer programs that are used to access the information stored in databases, therefore often require tremendous resources to handle the heavy workloads placed on such systems. As such, significant resources have been devoted to increasing the performance of database management systems with respect to processing searches, or queries, to databases.

Improvements to both computer hardware and software have improved the capacities of conventional database management systems. For example, in the hardware realm, increases in microprocessor performance, coupled with improved memory management systems, have improved the number of queries that a particular microprocessor can perform in a given unit of time. Furthermore, the use of multiple microprocessors and/or multiple networked computers has further increased the capacities of many database management systems.

From a software standpoint, the use of relational databases, which organize information into formally-defined tables consisting of rows and columns, and which are typically accessed using a standardized language such as Structured Query Language (SQL), has substantially improved processing efficiency, as well as substantially simplified the creation, organization, and extension of information within a database. Furthermore, significant development efforts have been directed toward query "optimization," whereby the execution of particular searches, or queries, is optimized in an automated manner to minimize the amount of resources required to execute each query.

Through the incorporation of various hardware and software improvements, many high performance database management systems are able to handle hundreds or even thousands of queries each second, even on databases containing millions or billions of records. However, further increases in information volume and workload are inevitable, so continued advancements in database management systems are still required.

One area that has been a fertile area for academic and corporate research is that of improving the designs of the "query optimizers" utilized in many conventional database management systems. The primary task of a query optimizer is to choose the most efficient way to execute each database query, or request, passed to the database management system by a user. The output of an optimization process is typically referred to as an "execution plan," "access plan," or just "plan." Such a plan typically incorporates (often in a proprietary form unique to each optimizer/DBMS) low-level information telling the database engine that ultimately handles a query precisely what steps to take (and in what order) to execute the query. Also typically associated with each generated plan is an optimizer's estimate of how long it will take to run the query using that plan.

An optimizer's job is often necessary and difficult because of the enormous number (i.e., "countably infinite" number) of possible query forms that can be generated in a database management system, e.g., due to factors such as the use of SQL queries with any number of relational tables made up of countless data columns of various types, the theoretically infinite number of methods of accessing the actual data records from each table referenced (e.g., using an index, a hash table, etc.), the possible combinations of those methods of access among all the tables referenced, etc. An optimizer is often permitted to rewrite a query (or portion of it) into any equivalent form, and since for any given query there are typically many equivalent forms, an optimizer has a countably infinite universe of extremely diverse possible solutions (plans) to consider. On the other hand, an optimizer is often required to use minimal system resources given the desirability for high throughput. As such, an optimizer often has only a limited amount of time to pare the search space of possible execution plans down to an optimal plan for a particular query.

A typical optimization process often involves numerous mathematical calculations in order to estimate the amount of processing resources required to execute a query using a particular access plan, often referred to as the "cost" of the access plan. A cost is usually expressed in some unit of time, and an optimizer typically works by calculating the cost for each plan, then comparing each plan to the other available options and choosing the best (or most efficient) plan, a process often referred to as "costing."

Nearly all computations involved in a costing process are based on statistical information about the values in particular columns of data in the files (or tables) referenced in a query, and as such a costing process is necessarily probabilistic in nature since the only way to know such information with 100% certainty is to run the query. Doing so would be foolish, since a) there are countless possible plans to try, and b) the whole purpose of the optimizer is to generate the best way to run the query a priori.

The statistical information about the values in columns of tables is referred to as metadata, which can be used to help an optimizer find answers to an innumerable number of questions, including but not limited to questions such as:

How many rows will be selected by a given WHERE clause (without regard to which access path or plan is chosen)?

How many random I/O and/or sequential I/Os will occur if a given access path is used to evaluate a given row selection?

How many groups will be produced for a given grouping expression?

How many distinct values will be found in the result set defined with a given select list expression, group by expression, and selection expression?

Conventional optimizers typically contain all aspects of such metadata, including their source (statistics collection, index statistics, etc.), type of data collection (e.g., random sample-based histogram), and the complexity of manipulating this raw information into metadata that can be directly used by the optimizer in its costing work.

One problem associated with incorporating metadata handling functionality in an optimizer is due to the lack of flexibility in optimally processing metadata during costing operations. In particular, collecting and refining metadata can be performed in a number of different manners, and new algorithms for performing such operations are continuously being developed. However, typically an optimizer is hard coded with specific algorithms for collecting and refining metadata. The introduction of a new algorithm into an optimizer would typically require extensive changes to the optimizer, so it is unlikely that a particular optimizer design will use the most efficient and up-to-date algorithms to handle metadata.

As an example, some optimizers use a type of metadata referred to as a "filter factor" to do estimates of how many records part of query will return, a process that is often critical in deciding, for example, in what order to join multiple files. There are many ways for such filter factors to be determined based on raw statistics and other data; for the purposes of optimization, however, those methods should be irrelevant. The optimizer simply wants to know what to use for a filter factor; it should not have to be concerned with how to construct one. Nonetheless, conventional optimizer designs are often limited to one particular method of calculating a filter factor.

In addition, the optimization of a single query (referred to herein as an optimizer instance) may be a long-running process, during which the contents and other characteristics of the involved database files may change. To ensure consistent costing results, each optimizer instance desirably would use consistent values for its metadata, no matter how many times the same columns and combinations are used in cost estimation. To address this concern, some optimizers attempt to keep track of these values themselves, which adds unnecessary complexity to their logic. Other optimizers ignore the problem altogether, often resulting in inexplicable and unreproducible cost estimate differences.

Furthermore, conventional optimizer implementations typically retrieve raw statistical data and other information about the values in a table directly from the table itself. This means that for similar queries involving the same columns in different processes and/or in different but similar combinations (a very common occurrence in most environments), the same calculations and analysis must be repeated in each optimization process that takes place on the system in order to do cost estimation for columns from those tables. Often, this is a waste of time and system resources, since if the values in the file do not change for a given period of time, neither will any of the metadata or the values derived from them during that period.

Therefore, a significant need exists in the art for a manner of facilitating the management of metadata in association with generating cost estimates during optimization of database queries in a database management system.

SUMMARY OF THE INVENTION

The invention addresses these and other problems associated with the prior art by providing an apparatus, program product and method in which a "metadata manager" is used to collect metadata associated with a database, and to supply such metadata to multiple optimizer instances that generate execution plans for associated queries. By doing so, often operations such as collecting, refining, retrieving and/or maintaining of metadata can be off-loaded from the optimizer instances, often accelerating individual cost estimation calculations by optimizer instances, facilitating reuse of metadata calculations and refinements among the various optimizer instances, and improving metadata consistency between multiple related cost estimates.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments discussed hereinafter utilize a metadata manager to facilitate the collection of metadata from a database, and to supply such metadata to a plurality of optimizer instances in connection with the optimization of database queries. As discussed hereinafter, a metadata manager may be configured to handle the tasks of collecting, refining, retrieving and/or maintaining metadata for one or more databases, thus off-loading responsibility for such tasks from individual optimizers or optimizer instances that make use of that metadata. As a result, the overhead associated with generating cost estimates for each individual query optimization is often reduced. Moreover, by centralizing metadata and making the metadata available to multiple instances of an optimizer, metadata consistency and reuse is substantially improved. As an additional matter, by implementing metadata handling functionality outside of optimizer instances, improvements to metadata collection, refinement and maintenance algorithms may be implemented within a metadata manager without requiring modification of optimizer program code.

It will be appreciated that metadata, with respect to a database, may be considered to include practically any information that characterizes the data within a database, e.g., information about the database structure, as well as the specific values, distributions of values, and sizes for the various columns and rows in the tables, files or other data structures within a database.

It will also be appreciated that a metadata manager consistent with the invention may be used in connection with a wide variety of database architectures, including relational databases, object-oriented databases, etc. Moreover, it will be appreciated that an "instance" of an optimizer may refer to any number of programming constructs, including separate optimizer programs, or threads within a single optimizer program, capable of accessing the same database. Moreover, multiple instances or optimizers need not be identically configured to one another, and indeed, an instance of an optimizer may refer to the operation of the same optimizer program code in processing multiple queries, either in parallel or serially. For example, multiple optimizer instances may refer to the sequential processing of multiple queries by the same optimizer program. The invention is therefore not limited to the specific implementations discussed herein.

Hardware/Software Environment

Figure 1:
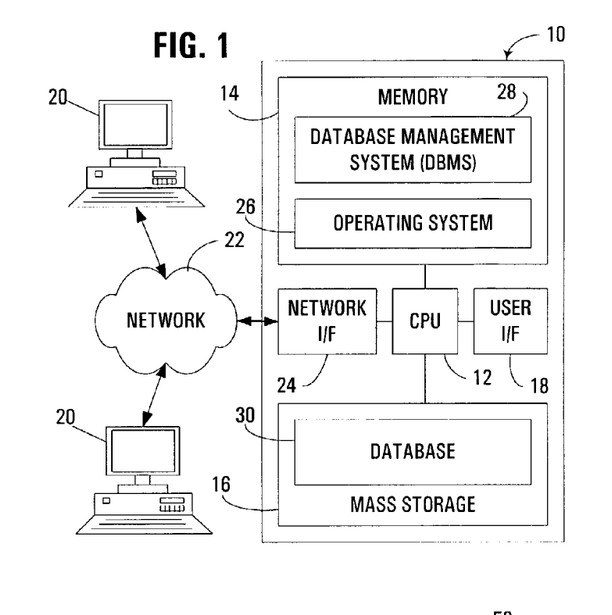
FIG. 1 is a block diagram of a networked computer system incorporating a database management system incorporating metadata management consistent with the invention.

Turning now to the Drawings, wherein like numbers denote like parts throughout the several views, FIG. 1 illustrates an exemplary hardware and software environment for an apparatus 10 suitable for implementing a database management system incorporating metadata management consistent with the invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer," although it should be appreciated the term "apparatus" may also include other suitable programmable electronic devices consistent with the invention.

Computer 10 typically includes a central processing unit (CPU) 12 including one or more microprocessors coupled to a memory 14, which may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor in CPU 12, as well as any storage capacity used as a virtual memory, e.g., as stored on a mass storage device 16 or on another computer coupled to computer 10.

Computer 10 also typically receives a number of inputs and outputs for communicating information externally. For interface with a user or operator, computer 10 typically includes a user interface 18 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal, e.g., via a client or single-user computer 20 coupled to computer 10 over a network 22. This latter implementation may be desirable where computer 10 is implemented as a server or other form of multi-user computer. However, it should be appreciated that computer 10 may also be implemented as a standalone workstation, desktop, or other single-user computer in some embodiments.

For non-volatile storage, computer 10 typically includes one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may also include an interface 24 with one or more networks 22 (e.g., a LAN, a WAN, a wireless network, and/or the Internet, among others) to permit the communication of information with other computers and electronic devices. It should be appreciated that computer 10 typically includes suitable analog and/or digital interfaces between CPU 12 and each of components 14, 16, 18, and 24 as is well known in the art.

Computer 10 operates under the control of an operating system 26, and executes or otherwise relies upon various computer software applications, components, programs, objects, modules, data structures, etc. (e.g., a database management system (DBMS) 28 shown resident in memory 14, and database 30 shown resident in mass storage 16, among others). Moreover, various applications, components, programs, objects, modules, etc. may also execute on one or more processors in another computer coupled to computer 10 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Metadata Management Architecture

Figure 2:
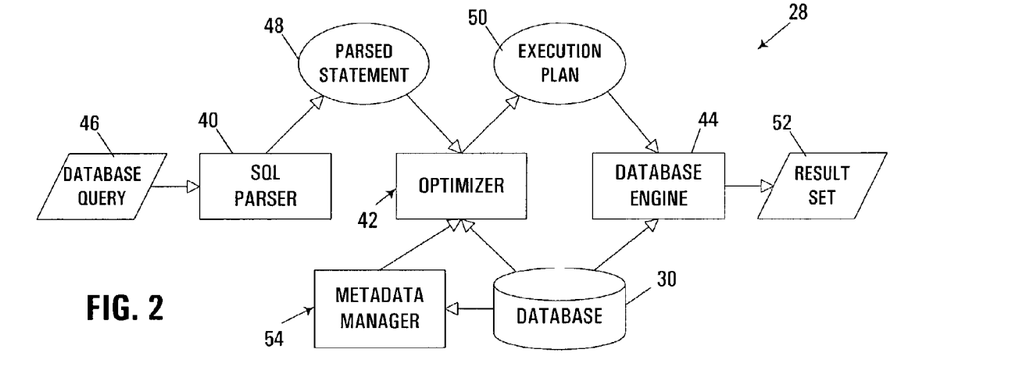
FIG. 2 is a block diagram illustrating the principal components and flow of information therebetween in the database management system of FIG. 1.

As discussed above, embodiments consistent with the invention incorporate metadata management functionality into a database management system to facilitate the collection, refinement, retrieval and maintenance of the metadata utilized by an optimizer in optimizing database queries. As shown in FIG. 2, for example, an exemplary implementation of database management system 28 is shown. The principal components of database management system 28 that are generally relevant to query optimization are an SQL parser 40, optimizer 42 and database engine 44. SQL parser 40 receives from a user a database query 46, which in the illustrated embodiment, is provided in the form of an SQL statement. SQL parser 40 then generates a parsed statement 48 therefrom, which is passed to optimizer 42 for query optimization. As a result of query optimization, an execution or access plan 50 is generated. Once generated, the execution plan is forwarded to database engine 44 for execution of the database query on the information in database 30. The result of the execution of the database query is typically stored in a result set, as represented at block 52.

Metadata management in the embodiment of FIG. 2 is centralized within a metadata manager subsystem 54 in the database management system. As will become more apparent below, metadata is collected from database 30 by metadata manager 54 and provided upon request to optimizer 42 in connection with the optimization of database queries. As shown in FIG. 2, however, it will be appreciated that additional metadata may be directly accessed from database 30 by optimizer 42 during optimization of a database query in some circumstances, e.g., where there is no anticipation that the metadata has any use in connection with any other optimizations currently or thereafter being performed by the optimizer.

Figure 3:
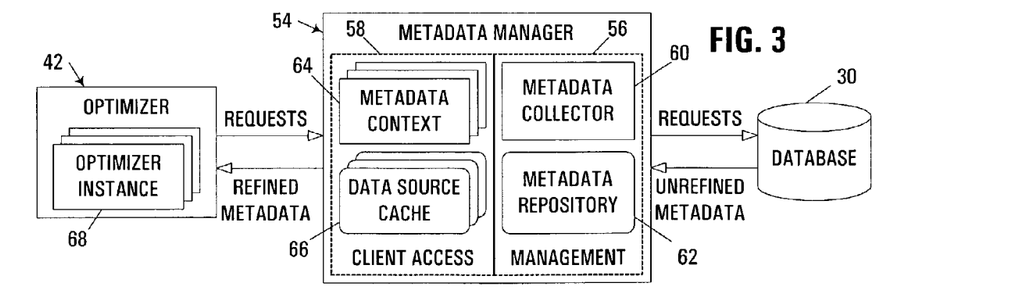
FIG. 3 is a block diagram illustrating the principal components in the optimizer and metadata manager referenced in FIG. 2.

FIG. 3 illustrates the primary components in metadata manager 54 for implementing the herein-described metadata management functionality. In general, metadata manager 54 has two principal functions, that of managing the collection, refinement, etc., of metadata from database 30 (as represented at block 56), and that of servicing requests for the metadata from the optimizer (as represented at block 58). The servicing of requests may also be considered to be a form of client access management, as the optimizer and its instances are analogous in many respects to clients for metadata, while the metadata manager is analogous to a server for metadata.

From the standpoint of managing the metadata, metadata manager 54 includes a metadata collector component 60, and an optional metadata repository 62 that is configured to store refined and/or unrefined metadata for use by the metadata manager in supplying metadata to the optimizer. Metadata is generally collected by the metadata collector via requests issued to the database 30, which generally results in the retrieval of "unrefined" metadata, that is, raw statistical information from the database.

From the standpoint of servicing optimizer requests, metadata manager 54 includes a plurality of metadata contexts 64 and a plurality of data source caches 66. Metadata contexts 64 individually provide interfaces for specific optimizer instances 68 resident in optimizer 42. Put another way, in the illustrated embodiment, metadata contexts are dedicated or bound to individual optimizer instances. It is thus through interaction between an optimizer instance and its associated metadata context that metadata is supplied to the optimizer instance by the metadata manager.

The multiple metadata contexts 64 are used to establish relationships between the optimizer instances 68 and a plurality of data source caches 66. Each data source cache 66 is configured to temporarily store metadata associated with a particular data source, e.g., a particular table or file in the database. Moreover, as will become more apparent below, data source caches 66 are accessible by multiple metadata contexts, thus permitting multiple optimizer instances to access the metadata stored in a particular data source cache.

Figure 4:
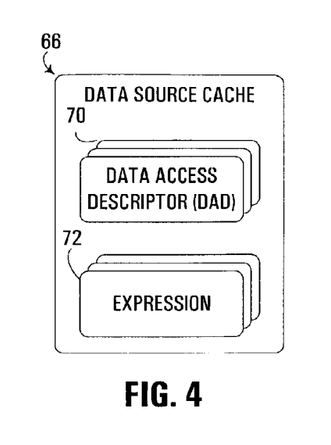
FIG. 4 is a block diagram illustrating the principal components in each data source cache referenced in FIG. 3.

As shown in FIG. 4, a data source cache 66 in the illustrated embodiment typically includes one or more data access descriptors (DAD's) 70 and one or more expressions 72. Data access descriptors are used to provide an optimizer with the necessary metadata information regarding a particular path to some data in the data source. Expressions are used to specify particular questions to be evaluated during costing by an optimizer.

A more detailed discussion of the concept of "metadata," and of each of the aforementioned components, in described in greater detail below. However, it should be appreciated that the specific architecture of the metadata manager, optimizer, and other components in database management system 28 are not exclusive. In particular, other components may be incorporated into database management system 28, as may other suitable database management architectures. Other database programming and organizational architectures may also be used consistent with the invention. Therefore, the invention is not limited to the particular implementation discussed herein.

Optimizer Metadata

At least a portion of the metadata needed by an optimizer in performing cost estimates cannot be obtained directly from a database, but must be processed, or refined, to some extent prior to use by an optimizer. Such metadata may be referred to as "refined" metadata. It is important to note, however, that typically the collection, refinement and source of origin for refined metadata is irrelevant to an optimizer, and as such, the separation of these operations from individual optimizer instances enables the optimizer to request metadata in the abstract, without having to deal specifically with how to obtain such metadata.

A wide variety of refinements may be performed to produce useful metadata for an optimizer, and indeed a number of different types of metadata, refined conventionally by an optimizer directly after retrieving raw statistical data from a database, may be used in the illustrated embodiment. In fact, practically any metadata that may be calculated or refined by an optimizer may instead be calculated or refined by a metadata manager consistent with the invention.

Without limiting the invention to these specific metadata types, the following are a few examples of refined metadata within the context of the invention:

Filter Factor: A filter factor represents, for a given expression from the optimizer, the percentage of total records that would be selected by applying the expression (and its children) to the current contents of the tables described by a particular access method.

Distinct Row Count: A distinct row count represents, for a given expression, the number of distinct records that would result from applying the expression to a set of possible rows from a data source. In the simplest form, where the expression is a simple column operand, the distinct row could is just the cardinality of that column.

Access Characteristics: Access characteristics are packages of metrics (measurements) that can be associated with an expression as satisfied by particular access paths assigned to a data source. Possible components include, for example, the total keys probed, the number of ranges, the number of keys selected, the number of access path random I/Os, the number of access path sequential I/Os, the number of dataspace random I/Os, the number of sequential dataspace I/Os, etc.

In addition, besides any numerical values themselves, optimizer metadata may also include attributes such as an "aging" stamp, or a value representing the theoretical degree of error in the numeric values.

Data Access Descriptors

As mentioned above, an optimizer must often choose from a large domain of access methods to construct a plan for executing a query. In making such decisions, the optimizer is often interested in certain quantitative and qualitative measurements for those access methods as applied to parts of a specific query. A data access descriptor (DAD) may be used to represent in an abstract form, all and only such information required by the optimizer about a particular path to some data (such as index).

This approach has several advantages over conventional optimizers. First, since the optimizer need not be concerned with what kind of access a DAD represents, be it an index, a temporary data set, etc., the cost estimate generation process may be simpler from the optimizer's perspective. The optimizer can use the DAD general abstraction during costing operations rather than being concerned with specific access path types. Second, since a DAD is simply an abstract representation of a path or data access method, the access path (index or other) does not even have to exist in some implementations, and the optimizer can be oblivious to this fact as well. Doing so permits an optimizer to do "what-if" scenarios, where the optimizer can cost plans that would potentially use that path if it did exist, which can allow one to see the effects of creating an index, for example, without actually having to create it.

A DAD may represent any number of access methods, including relational tables, subsets of the columns of tables, indexes over tables, hash tables, etc. A DAD may include various attributes depending upon the type of access method being represented, including but not limited to: ordered record information (keys, ascending or descending sort, columns involved, etc.), number of rows, average I/O cost for row access, list of dependent DAD's, etc.

Data Sources & Data Source Caches

A data source is an abstraction that represents to the optimizer a potential stream of database records (tuples) at run time. The metadata manager constructs and maintains data source cache (DSC) instances as temporary holding places for metadata specific to a snapshot in time for that data source.

In the illustrated embodiment, each DSC has two principal roles.

First, a DSC acts as a system wide "fast access" holding place for DAD's and expressions as built from optimizer requests, complete with their corresponding optimizer metadata. When used in a multithreaded system, this means that multiple optimizer instances on a system can simultaneously have access to any previously calculated (and now cached) vales for a data source.

Second a DSC provides a consistent image of the metadata that originated from a particular data source. A DSC typically includes descriptive information for the data source (file or other object), along with representations of all access paths (indexes) that exist for that data source (at the point in time that the cache was constructed), which provides consistency and reproducibility for cost calculations. Data source caches may be configured to ensure that this information remains unchanged while an instance of the DSC is in existence, even if the underlying information from the data source changes during the process of optimization of a query.

In the illustrated embodiment, each DAD instance is associated with exactly one data source cache, so a) together they may provide a consistent quantitative view of the data sources throughout optimization, and b) their optimizer metadata can be used by multiple optimizer instances in order to take advantage of calculations already done. A DSC therefore provides a common anchor point for all requests about the underlying data in any file being queried, since it returns the same answer in cases where the same request is made repeatedly. The decisions made when comparing different access plans will be made from "snapshots" of the underlying data, and the optimizer will have a consistent basis for making comparisons.

In some embodiments of the invention, if the information in a DSC instance grows out of date (e.g., by tracking what contexts are still using the DSC, by comparing timestamps, etc.), the instance may be marked obsolete, which will cause the instance to acquire no new users (i.e., contexts). When there are no more active optimizer instances connected to an obsolete DSC, it may be deleted by the metadata manager, e.g., via a process similar to garbage collection.

Metadata Contexts

A metadata context is used to maintain a relationship between an optimizer instance and the data source caches for which the optimizer wants metadata. The term "context" is appropriate because this mechanism typically defines the "domain" or "environment" that the optimizer instance will run in with respect to the metadata it requires.

Once a particular context has been established by an optimizer instance, its primary role is to construct and manage DSC's as required to provide a "pool" of consistent answers to the specific metadata requests made by that optimizer instance—even as the underlying information might be changing. Each DAD constructed via a context ties that DAD to a particular DSC. A context may be tied to multiple DSC's (as multiple files may be referenced in a query), but for any data source, a context typically uses one and only one DSC to retrieve information from which to compute and return optimizer metadata.

In the illustrated embodiment, DSC's are scoped globally, and not to a particular context, so that multiple optimizer instances may be tied to the same DSC. Each context can add new expressions to the DSC, and/or reuse expression that have already been built by itself or by others. The corresponding optimizer metadata is stored with these expressions, making it quickly available to subsequent requesters.

In the illustrated embodiment, there are two types of interfaces to a metadata context. The first interface type allows a client (optimizer instance) to identify the sources of data in which it is interested, returning data access descriptions (DAD's) for each, so the client will be able to glean access characteristics about the data sources.

The second interface type allows a client to build expressions that embody questions about specified data sources. In the illustrated embodiment, these expression building methods manufacture and assemble individual elements into a tree-like relationship. After asking the context to assemble an expression, the client can then use methods on that expression to find how it affects access to its data source.

Expressions

The metadata manager may also define expressions to be used on requests for certain optimizer metadata (such as Filter Factor and Access Characteristics). In general, expressions represent the database entities (fields, literals, tables, etc.) and their relationships to each other as specified in part of a query. The metadata manager is typically responsible for evaluating a given expression in light of the questions being asked, which may occur in different ways based on what request was made of the metadata. Moreover, typically the metadata results of an expression are cached with the expression once calculated on behalf of an optimizer instance, so that later attempts to evaluate an expression by the same or a different optimizer instance may simply result in the previously-calculated metadata results being returned to the requesting client.

In the illustrated embodiment, expressions include two subspecies, operands and operators, which are arranged by the optimizer into a tree or graph of parent-child relationships.

An expression is said to "provide a value." If it has no operators, the expression is the value. Otherwise, the value is the result of applying the operator to its operands—which are themselves expressions. Furthermore, a predicate is defined as a conditional operator which when applied to other expressions can be evaluated as either true or false. The top expression in a tree is typically always a predicate (i.e., returns true or false).

For example, expressions may be used to represent portions of the WHERE and HAVING predicates from a query, since the optimizer has a need to find out how selective these predicates are in order to do things like change the order of files being joined. The more selective the predicates, the fewer records will pass the tests; the optimizer naturally wants to position the most selective operations first, to avoid unnecessary processing of records that will not be returned eventually anyway.

In the illustrated embodiment, some of the kinds of expressions that may be supported include but are not limited to:

Column: Represents a database column (field). Column expressions indicate to which DAD they belong. Note that the column does not have to exist in a real file, it might be from a temporary result set or a hypothetical table.

Literal: Represents a value expressed literally in the query. The value typically cannot be changed once the literal expression has been created.

Relational Operator: Operators that return true or false (e.g., various comparisons).

Logical Operator: Binary logical connective operators such as AND and OR whose result is true or false. Their operand(s) typically must be of type Boolean.

Figure 5:
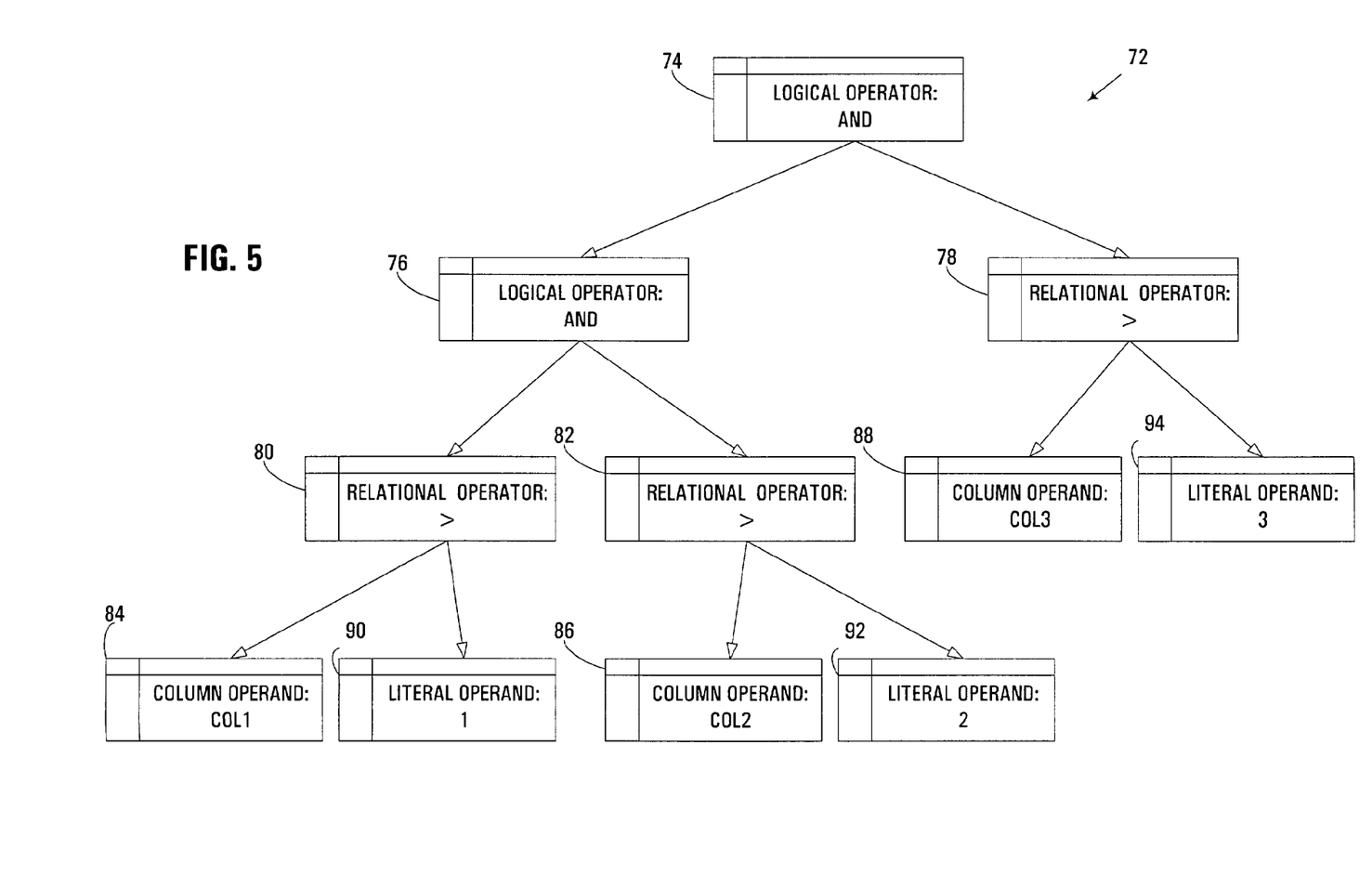
FIG. 5 is a block diagram illustrating an exemplary expression of the type capable of being constructed by an optimizer instance in the data source cache of FIG. 4.

As a further illustration of the manner in which an expression may be implemented, consider the following exemplary SQL query:
SELECT*FROM FILE-2
WHERE COL1>1
 AND COL 2>2
 AND COL 3>3

The WHERE qualifier of this query may be represented as an expression and evaluated by the metadata manager in response to an optimizer instance request so as to provide metadata to the optimizer instance that is reflective of how many rows will likely match the query. One suitable implementation of such an expression as a tree structure 72 is shown in FIG. 5. To represent the aforementioned WHERE qualifier in an expression, a pair of AND logical expressions 74, 76, a set of "greater than" relational expressions 78, 80 and 82, a set of column expressions 84, 86 and 88, and a set of literal expressions 90, 92 and 94 may be used. Expressions may therefore be constructed of other expressions.

Expressions are typically constructed by optimizer instances, then passed to metadata contexts for evaluation. The metadata for an expression that is returned to an optimizer instance by a metadata context may be attached to the original expression object, or may be represented in a separate data structure. In addition, the metadata may be associated with a time stamp for use in identifying the "freshness" of the metadata.

Other data may also be incorporated into an expression, such as descriptive information about the types and other constraints on an expression's operands. It will also be appreciated that other types of expression operands and operators may be supported by a metadata manager consistent with the invention. Moreover, other manners of representing expressions or tests in software may be used in the alternative, including hard codes tests. Other data structures may also be used to represent an expression. The invention is thus not limited to the particular expression architecture discussed herein.

Optimization of Database Queries Using Metadata Manager

Figure 6:
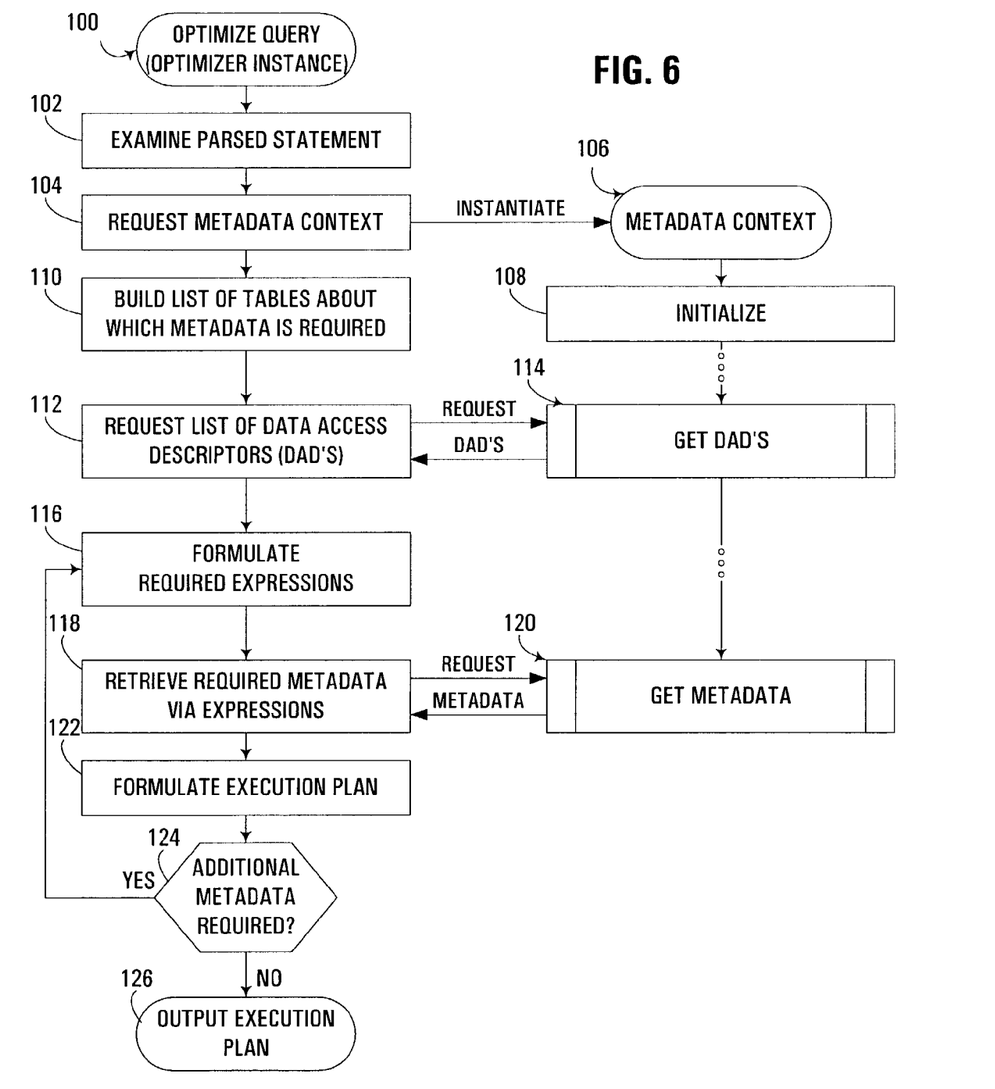
FIG. 6 is a flowchart illustrating the interaction between an optimizer instance and a metadata context from the metadata manager of FIG. 2 during optimization of a query in a manner consistent with the invention.

FIG. 6 next illustrates the program flow occurring during optimization of a query in database management system 28, additionally illustrating the interaction between an optimizer instance and a metadata context in a metadata manager during such processing. Specifically, as shown beginning at block 100, in response to a request to optimize a query, an optimizer instance will be instantiated in the optimizer to process the query, the query typically taking the form of a parsed statement as described above in connection with FIG. 2.

As shown in block 102, the optimizer instance initially examines the parsed statement, in a manner generally known in the art. Next, in block 104, the optimizer instance requests a metadata context from the metadata manager. As shown at block 106, such a request results in dynamic construction or instantiation of a metadata context object, which is initialized in block 108 to bind the metadata context to the optimizer instance. As a result, the instantiated metadata context serves as the interface for the optimizer instance with the metadata manager.

Once a metadata context is requested by the optimizer instance, the optimizer instance then builds a list of tables in the database about which metadata is required, as shown in block 110. The list of tables represents the data sources that will be accessed during execution of the query. Next, in block 112, the optimizer instance requests from the metadata manager a list of data access descriptors (DAD's) for the tables, or data sources, from which metadata is required by the optimizer instance. The request for the data sources is made upon the metadata context object, which executes a get DAD's routine 114 and returns a list of relevant DAD's to the optimizer instance.

Next, in block 116, the optimizer instance formulates and builds any required expressions necessary for formulating the execution plan. For example, block 116 may determine whether any WHERE, ORDER BY or other qualifiers are present in a query, and if so, construct expressions that query the database for metadata that is indicative of how such qualifiers will affect the execution of a query. Additional expressions may also be formulated at this time to request other types of metadata, including metadata such as cardinality of columns, numbers of columns and/or rows, etc.

Once all required expressions have been formulated by the optimizer instance, the optimizer instance then proceeds to retrieve its required metadata from the metadata manager via the formulated expressions, as shown in block 118. Requests are issued to the metadata context by the optimizer instance, and are processed by a get metadata routine 120 resident in the metadata manager, resulting in the requested metadata being returned to the optimizer instance via the bound metadata context. Typically, the expressions themselves are passed from the optimizer instance to the metadata context for evaluation, and metadata is returned to the optimizer instance by passing the expression back to the optimizer instance with the metadata attached. Other manners of communicating expressions and metadata between an optimizer instance and a metadata context may be used in the alternative.

Next, the optimizer instance formulates the execution plan as shown in block 122, in much the same manner as a conventional optimizer, with the exception that the metadata has been obtained from the metadata manager, rather than being collected and refined directly by the optimizer instance.

Formulation of an execution plan is typically an iterative process, including comparisons between competing execution plans to arrive at a most efficient plan. As such, block 124 represents the interactive nature of the plan formulation process, whereby any time additional metadata is required during plan formulation, or any time additional plans need to be formulated for comparison purposes, control is returned to block 116 to formulate any additional required expressions as necessary. Once an optimal execution plan is generated, block 124 then passes control to block 126 to output the formulated execution plan to the database engine, for execution thereby in a manner known in the art.

Figure 7:
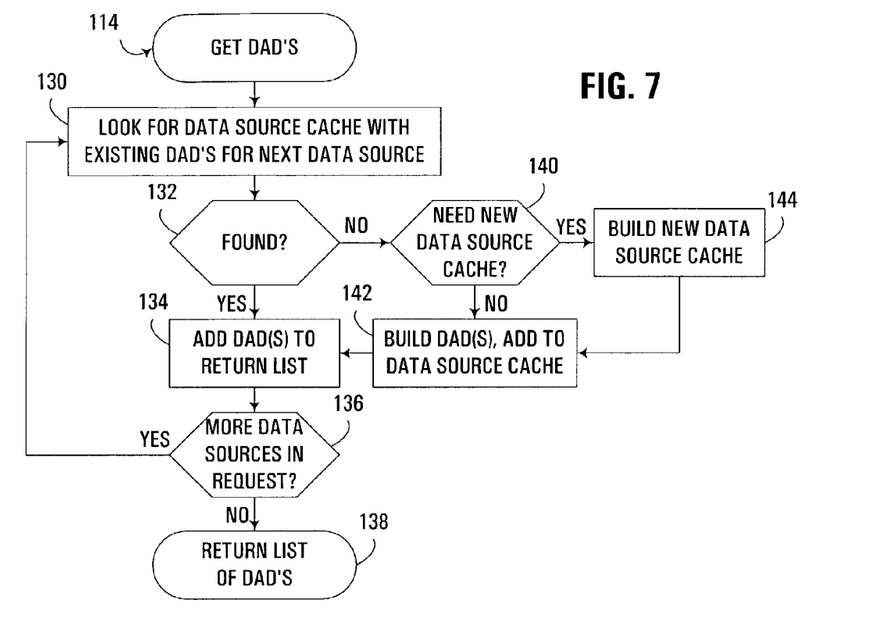
FIG. 7 is a flowchart illustrating the program flow of the get DAD's routine executed by a metadata context and referenced in FIG. 6.

FIG. 7 illustrates one implementation of get DAD's routine 114 in greater detail. Routine 114 is executed by the metadata context, and begins in block 130 by looking for a data source cache with one or more existing DAD's for the next unprocessed data source referenced in the request from the optimizer instance. If an existing DSC and DAD are found, block 132 passes control to block 134 to add any existing DAD's to a return list, whereby control then passes to block 136 to determine whether any unprocessed data sources remain in the request. If so, control returns to block 130. Otherwise, control passes to block 138 to terminate the routine and return the list of DAD's to the calling optimizer instance.

Returning to block 132, if no existing DAD is found for a data source, control passes to block 140 to determine whether a new data source cache is required, i.e., whether an active data source cache exists for the data source. If a data source cache exists, control passes to block 142 to dynamically construct, or build, one or more new DAD's for the data source (e.g., more than one DAD if multiple indexes or other access paths exist for the data source), and then add the new DAD(s) to the data source cache. Control then passes to block 134 to add the new DAD(s) to the return list. If no data source cache exists, block 140 passes control to block 144 to dynamically construct, or build, a new data source cache, prior to passing control to block 142.

Figure 8:
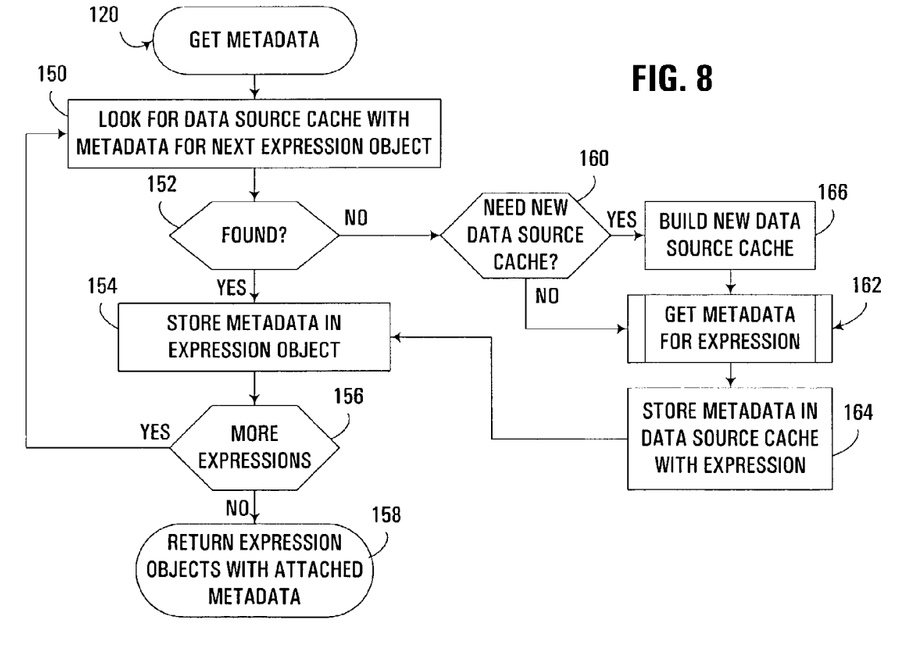
FIG. 8 is a flowchart illustrating the program flow of the get metadata routine executed by a metadata context and referenced in FIG. 6.

FIG. 8 illustrates one implementation of get metadata routine 120 in greater detail. Routine 120 is executed by the metadata context, and begins in block 150 by looking for a data source cache with existing metadata for the next unprocessed expression object referenced in the request from the optimizer instance. If existing metadata is found, block 152 passes control to block 154 to store the metadata in the expression object (e.g., by attaching the metadata to the object) for return to the optimizer instance. Control then passes to block 156 to determine whether any unprocessed expression objects remain in the request. If so, control returns to block 150. Otherwise, control passes to block 158 to terminate the routine and return the expression objects with the metadata requested by the optimizer instance attached thereto.

Returning to block 152, if no existing metadata is found for the expression object, control passes to block 160 to determine whether a new data source cache is required, i.e., whether an active data source cache exists for the data source for which an expression is requested. If a data source cache exists, control passes to block 162 to call a get metadata for expression routine that retrieves raw statistical data from the database as necessary and calculates the requested metadata therefrom using the expression. Next, in block 164, the calculated metadata is stored in the data source cache along with a cached version of the expression, thus effectively caching the metadata and expression. Control then passes to block 154 to also store the metadata in the expression object originally passed to the metadata context for return to the optimizer instance.

Returning to block 160, if no data source cache exists, block 160 passes control to block 166 to build a new data source cache, prior to passing control to block 162.

Figure 9:
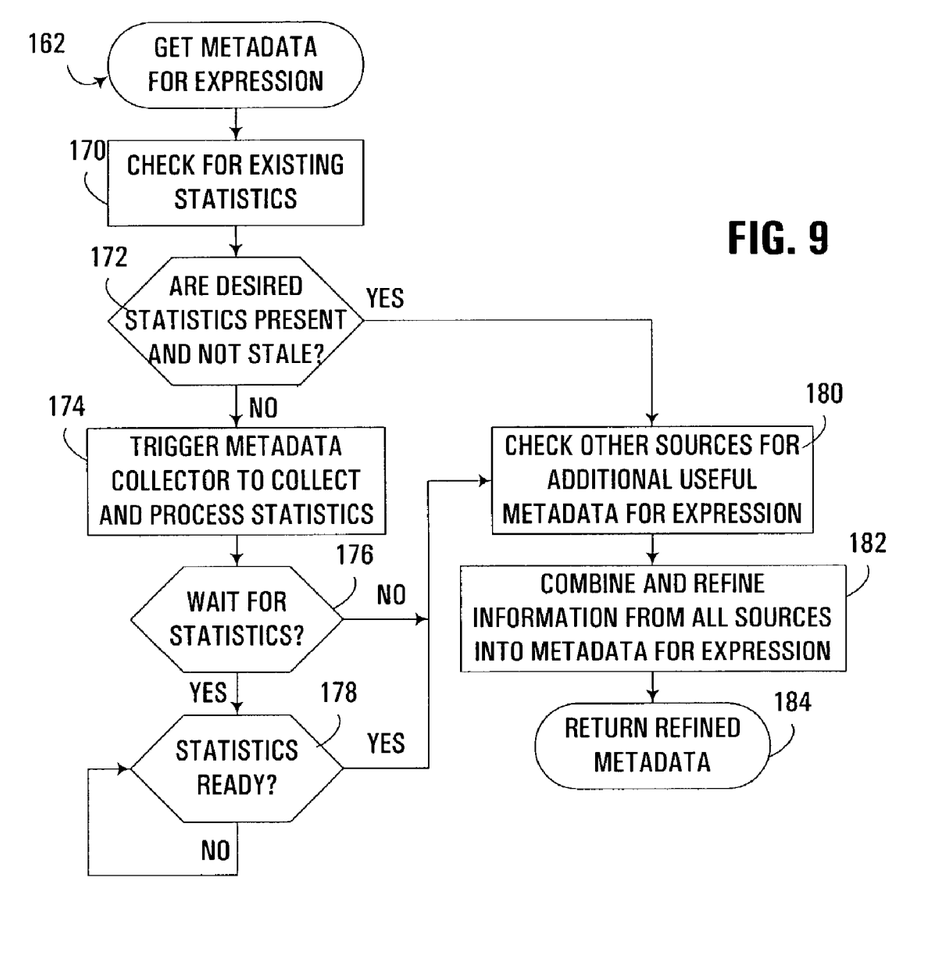
FIG. 9 is a flowchart illustrating the program flow of the get metadata for expression routine executed by a metadata context and referenced in FIG. 8.

FIG. 9 illustrates one implementation of get metadata for expression routine 162 in greater detail. Routine 162 is executed by the metadata context, and begins in block 170 by checking for existing statistics relevant to the expression being processed. If some or all the necessary statistics are not present and/or if any of the necessary statistics are stale (e.g., have a timestamp earlier than a particular time frame), block 172 passes control to block 174 to trigger the metadata collector to collect and process the necessary or stale statistics in a background process.

Next, block 176 determines whether the metadata context should wait for the statistics to be returned by the metadata collector, and if so, passes control to block 178 to wait for the statistics to be returned. In the illustrated embodiment, an optimizer instance may control whether a metadata context waits for unavailable statistics to be returned, e.g., by setting an attribute in a request. In some instances, it may be desirable for an optimizer instance to simply prime the metadata manager to begin collecting statistics so that the statistics will be available for future optimization instances.

Once the statistics are returned, or if it is not desirable to wait in the first place, blocks 176 and 178 pass control to block 180 to initiate a check for other sources of useful metadata for the particular expression. In addition, returning to block 172, if it is determined that all relevant statistics are present and not stale, control is passed directly to block 180 to initiate the check.

Next, block 182 combines the collected and pre-existing information (metadata and/or raw statistics) from all of the sources and refines the information into the appropriate metadata for the expression. Control then passes to block 184 to return the refined metadata and terminate routine 162.

As such, it will be appreciated that, through processing expressions in the manner described herein, the metadata manager is capable of calculating refined metadata from refined and/or unrefined metadata collected from the database by the metadata manager. Moreover, the metadata manager is capable of caching such refined metadata such that subsequent requests to the metadata manager for the same refined metadata (e.g., in response to requests that pass the same or a related expressions thereto) will be processed by returning the cached refined metadata, rather than recalculating the refined metadata.

As mentioned above, metadata collector typically operates using one or more background processes to collect statistics, and optionally refine such statistics into refined metadata. Any algorithms conventionally utilized in query optimizers may be used in the metadata collector to retrieve and/or refine metadata used in the manner described herein.

It will be appreciated that a wide variety of alternate algorithms and data structures may be utilized to implement a metadata manager consistent with the invention, and as such, the invention is not limited to this particular implementation. Moreover, it will be appreciated that implementation of the aforementioned algorithms and data structures in a database management system would be well within the abilities of one of ordinary skill in the art having the benefit of the instant disclosure.

Illustrative Example

Figure 10:
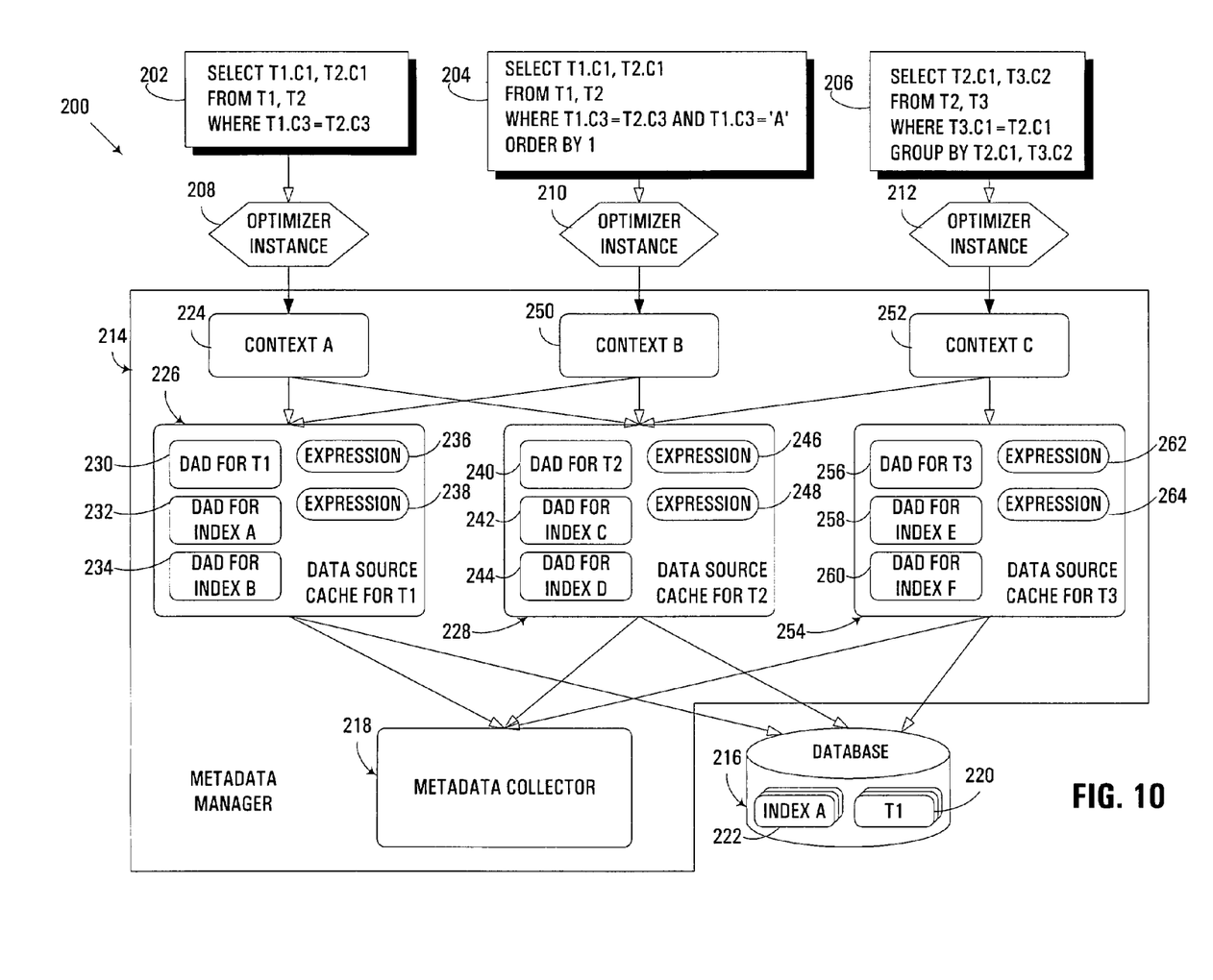
FIG. 10 is a block diagram illustrating the handling of a set of exemplary queries using the metadata manager of FIG. 2.

FIG. 10 illustrates an exemplary database environment 200 consistent with the invention, subsequent to optimization of three queries 202, 204 and 206 by a plurality of associated optimizer instances 208, 210 and 212. A metadata manager 214 is interposed between the optimizer instances and a database 216. Metadata manager 214 is illustrated as having a metadata collector object 218 that is utilized to collect and refine metadata in the manner described herein. Moreover, database 216 is illustrated including a plurality of tables 220, as well as a plurality of indexes 222 have been created by the database, in a manner known in the art.

Assuming for the purposes of the example that an optimizer instance 208 is initially executed to generate an execution plan for query 202, the optimizer instance would instantiate a metadata context 224 to interface the optimizer with the metadata manager. In response to a request for data access descriptors by the optimizer instance, context 224 would determine whether data source caches existed for either of tables T1 and T2, which are accessed by query 202. If either data source cache 226, 228 is not currently active, such a data source cache is dynamically instantiated in the metadata manager by context 224 (see routine 114 of FIG. 7).

For data source cache 226, context 224 may construct a number of data access descriptors 230, 232 and 234, as well as a number of expressions such as expressions 236, 238. Likewise, for data source cache 228, DAD's 240, 242 and 244, and expressions 246 and 248 may be constructed within the data source cache, either in connection with processing query 202, during prior optimizations, or even after processing either of queries 204, 206.

In the event that a data source cache is constructed by a context, it will be appreciated that the data source cache may initially contain no DAD's or expressions, and may need to be dynamically populated with DAD's and expressions as described above. Moreover, it will be appreciated that DAD's will typically be generated for the data source itself, as well as any access paths into the data source, including each available index for the data source.

Once the available DAD's are returned by context 224 to optimizer instance 208, the optimizer instance will generate expressions, e.g., expressions 236, 238, 246 and/or 248 as appropriate to access query 202.

Consider next the optimization of query 204, which may occur in parallel with or sometime after optimization of query 202. Optimization of query 204 is handled by optimizer instance 210, which results in the instantiation of context 250 to provide an interface between the optimizer instance and the metadata manager. In this instance, query 204 relies on the same data sources as query 202, and as a result, context 250 may not be required to instantiate new data source caches, but may rely on the existing data source caches 226 and 228 relied upon and used by context 224. As such, regeneration of metadata specifically required by optimizer instance 210 may not be required, and existing metadata resident in the data source caches 226, 228 may be returned with reduced processing overhead. Moreover, where expressions have been created and evaluated during optimization of query 202, the metadata determined thereby may be returned directly to optimizer instance 210 when optimizing query 204 to further reduce the overhead associated with optimizing the query.

For query 206, optimizer instance 212 is illustrated as interfacing with a context 252, which is associated with both an existing data source cache 228, as well as a newly-instantiated data source cache 254 that is used solely by context 252. As above, DAD's 256, 258 and 260, representing the available access methods to the data source, as well as any expressions 262, 264 are maintained in data source cache 254, either as a result of previous optimizations and requests for metadata in association with the data source cache, or as populated into the data source cache by context 252 during optimization of query 206.

It will be appreciated that, through the reuse of metadata and the provision of a centralized repository for collecting and refining metadata, the overhead associated with obtaining refined metadata during optimization of a query may be substantially reduced. Particularly for high volume database management systems where a high volume of queries is processed, the ability to re-use metadata among multiple queries can provide significant improvements in system-wide performance. Furthermore, the improved consistency of metadata, particularly when multiple competing execution plans are being compared by an optimizer, results in more stable and productive optimization results.

Various modifications may be made to the illustrated embodiments without departing from the spirit and scope of the invention. Therefore, the invention lies in the claims hereinafter appended.

What is claimed is:

1. A computer apparatus, comprising:
   (a) a metadata manager configured to collect metadata associated with a database; and
   (b) a plurality of optimizer instances, each optimizer instance configured to generate an execution plan for an associated query using metadata collected by the metadata manager wherein the metadata manager is configured to refine at least a portion of the metadata collected from the database prior to providing the refined metadata to at least one optimizer instance.

2. The apparatus of claim 1, further comprising a plurality of data source caches, each data source cache configured to cache metadata associated with a data source from the database.

3. The apparatus of claim 2, wherein the metadata manager is configured to dynamically construct at least one data source cache in response to a request from an optimizer instance for metadata associated with a data source from the database.

4. The apparatus of claim 2, wherein at least one data source cache includes a data access descriptor configured to store metadata associated with an access path to the data source.

5. The apparatus of claim 4, wherein the data access descriptor includes metadata representative of at least one of a database table, a subset of columns from a database table, an index over a table, and a hash table.

6. The apparatus of claim 4, wherein the metadata manager is configured to dynamically construct the data access descriptor in response to a request from an optimizer instance for metadata associated with a data source from the database.

7. The apparatus of claim 2, wherein at least two metadata contexts are configured to access a common data source cache such that metadata stored in the common data source cache is accessible to the optimizer instances associated with the two metadata contexts.

8. The apparatus of claim 1, wherein the metadata manager is configured to provide the refined metadata to multiple optimizer instances.

9. The apparatus of claim 1, wherein the metadata manager is configured to generate refined metadata by processing an expression constructed by a first optimizer instance among the plurality of optimizer instances.

10. The apparatus of claim 9, wherein the metadata manager is configured to return refined metadata to the first optimizer instance by attaching the refined metadata to the expression constructed by the first optimizer instance.

11. The apparatus of claim 9, wherein the metadata manager is configured to cache the refined metadata and to return the cached refined metadata to a second optimizer instance among the plurality of optimizer instances in response to a request from the second optimizer instance.

12. The apparatus of claim 1, wherein the metadata manager is configured to process a first request for first metadata by calculating refined metadata from unrefined metadata and returning the refined metadata as the first metadata, and to process a second request for the first metadata by returning the refined metadata as the first metadata without recalculating the refined metadata.

13. The apparatus of claim 12, wherein the first and second requests are issued by the same optimizer instance.

14. The apparatus of claim 12, wherein the first and second requests are issued by different optimizer instances.

15. A computer apparatus, comprising:
   (a) a metadata manager configured to collect metadata associated with a database;
   (b) a plurality of optimizer instances, each optimizer instance configured to generate an execution plan for an associated query using metadata collected by the metadata manager; and
   (c) a plurality of metadata contexts, each associated with an optimizer instance from the plurality of optimizer instances, and each configured to service access requests from an associated optimizer instance.

16. The apparaius of claim 15, wherein the metadata manager is configured to dynamically construct a metadata context in response to a request from an optimizer instance.

17. A computer, comprising:
   (a) a processor;
   (b) program code configured to execute on the processor to collect metadata associated with a database, the program code further configured to supply the metadata to at least one query optimizer for use in generating an execution plan for a database query; and
   a plurality of data source caches, each data source cache configured to cache metadata associated with a data source from the database;
wherein the program code is configured to dynamically construct at least one data source cache in response to a request from the query optimizer for metadata associated with a data source from the database.

18. The apparatus of claim 17, wherein the program code manager is further configured to dynamically construct a data access descriptor in connection with dynamically constructing a data source cache, wherein the data access descriptor is configured to store metadata associated with an access path to the data source.

19. The apparatus of claim 17, wherein the query optimizer includes a plurality of optimizer instances, the apparatus further comprising a plurality of metadata contexts, each associated with an optimizer instance from the plurality of optimizer instances, and each configured to service access requests from an associated optimizer instance, wherein the program code is configured to dynamically construct a metadata context in response to a request from an optimizer instance.

20. The apparatus of claim 19, wherein at least two metadata contexts are configured to access a common data source cache such that metadata stored in the common data source cache is accessible to the optimizer instances associated with the two metadata contexts.

21. The apparatus of claim 17, wherein the program code is configured to process a first request from the query optimizer for first metadata by calculating refined metadata from unrefined metadata and returning the refined metadata as the first metadata, and to process a second request from the query optimizer for the first metadata by returning the refined metadata as the first metadata without recalculating the refined metadata.

22. The apparatus of claim 21, wherein the query optimizer includes a plurality of optimizer instances, and wherein the first and second requests are from different optimizer instances.

23. A tangible computer readable program product, comprising:
   (a) program code configured to collect metadata associated with a database and to refine at least a portion of the collected metadata, the program code further configured to supply the metadata to at least one query optimizer for use in generating an execution plan for a database query; and (b) a tangible computer readable storage medium bearing the program code.

24. A computer-implemented method of managing metadata for a database, the method comprising:
   (a) collecting metadata associated with a database;
   (b) responding to a plurality of requests by at least one query optimizer by supplying the collected metadata thereto; and
   (c) refining the metadata collected from the database prior to supplying the refined metadata in response to a request from the query optimizer wherein a plurality of optimizer instances dynamically constructs a plurality of metadata contexts.

25. The method of claim 24, further comprising caching the metadata in a plurality of data source caches, each data source cache configured to cache metadata associated with a data source from the database.

26. The method of claim 25, further comprising dynamically constructing at least one data source cache in response to a request from the query optimizer.

27. The method of claim 25, wherein at least one data source cache includes a data access descriptor configured to store metadata associated with an access path to the data source.

28. The method of claim 27, further comprising dynamically constructing the data access descriptor in response to a request from the query optimizer for metadata associated with a data source from the database.

29. The method of claim 25, wherein the query optimizer includes a plurality of optimizer instances, the method further comprising dynamically constructing a plurality of metadata contexts in response to requests from the plurality of optimizer instances, each metadata context associated with an optimizer instance from the plurality of optimizer instances, and each configured to service access requests from an associated optimizer instance.

30. The method of claim 29, wherein at least two metadata contexts are configured to access a common data source cache such that metadata stored in the common data source cache is accessible to the optimizer instances associated with the two metadata contexts.

31. The method of claim 24, wherein refining the metadata includes processing an expression constructed by the query optimizer.

32. The method of claim 24, further comprising:
   (a) processing a first request for first metadata by calculating refined metadata from unrefined metadata and returning the refined metadata as the first metadata; and
   (b) processing a second request for the first metadata by returning the refined metadata as the first metadata without recalculating the refined metadata.

33. A computer-implemented method of optimizing a database query, the method comprising:
   (a) accessing a metadata manager to retrieve metadata associated with a database; and
   (b) using the retrieved metadata to optimize a database query;
wherein the retrieved metadata comprises refined metadata, and wherein the method further comprises, in the metadata manager, collecting unrefined metadata from the database and calculating the refined metadata from the collected unrefined metadata.

34. The method of claim 33, further comprising:
   (a) caching the refined metadata in the metadata manager;
   (b) accessing the metadata manager a second time to retrieve the cached refined metadata; and
   (c) using the cached refined metadata to optimize a second database query.

* * * * *